United States Patent [19] [11] 4,020,945
Takeno et al. [45] May 3, 1977

[54] SAFETY DEVICE FOR CONVEYOR BELT

[75] Inventors: Keigo Takeno; Yasuyuki Matsunaga, both of Kobe; Ryoichi Nomura, Hyogo; Akihiro Nagata, Kobe, all of Japan

[73] Assignee: Bando Chemical Industries, Ltd., Kobe, Japan

[22] Filed: Sept. 5, 1975

[21] Appl. No.: 610,559

[30] Foreign Application Priority Data

| Sept. 12, 1974 | Japan | 49-105732 |
| Sept. 12, 1974 | Japan | 49-105733 |
| Sept. 12, 1974 | Japan | 49-105734 |
| Sept. 30, 1974 | Japan | 49-113090 |
| Oct. 14, 1974 | Japan | 49-118428 |
| Oct. 14, 1974 | Japan | 49-118429 |
| Oct. 14, 1974 | Japan | 49-118430 |
| Oct. 31, 1974 | Japan | 49-126215 |
| Nov. 11, 1974 | Japan | 49-130116 |
| May 12, 1975 | Japan | 50-56562 |
| Aug. 4, 1975 | Japan | 50-95238 |

[52] U.S. Cl. .............................. 198/502; 198/810; 198/856
[51] Int. Cl.² ........................................ B65G 43/00
[58] Field of Search ........... 198/40, 232, 468, 502, 198/810, 856; 340/248 P, 259, 324 A

[56] References Cited
UNITED STATES PATENTS

| 3,135,867 | 6/1964 | Daneff | 340/259 X |
| 3,308,449 | 3/1967 | Uemura | 340/259 X |
| 3,636,436 | 1/1972 | Kurauchi et al. | 340/259 X |
| 3,651,506 | 3/1972 | Olaf et al. | 198/232 X |
| 3,666,080 | 5/1972 | Alfredsson | 198/38 |
| 3,742,477 | 6/1973 | Erabit | 198/232 X |
| 3,750,129 | 7/1973 | Takeno et al. | 198/40 |
| 3,834,518 | 9/1974 | Specht et al. | 198/40 |
| 3,834,524 | 9/1974 | Ratz et al. | 198/232 |
| 3,898,645 | 8/1975 | Coberley | 340/324 A |

FOREIGN PATENTS OR APPLICATIONS

| 2,047,954 | 9/1970 | Germany | 198/232 |
| 198,204 | 9/1967 | U.S.S.R. | 198/40 |

Primary Examiner—Evon C. Blunk
Assistant Examiner—Richard K. Thomson
Attorney, Agent, or Firm—Auslander & Thomas

[57] ABSTRACT

A safety device for a conveyor belt which comprises a pair of magnets buried in a joint of a belt or buried in the belt with the joint therebetween, with a certain space left therebetween in the lengthwise direction of the belt, a magnetic inductor arranged oppositely to said magnets, an oscillograph connected to said magnetic inductor for self-recording or a detecting device connected to said magnetic inductor for detecting any elongation at the joint in its early stages.

7 Claims, 22 Drawing Figures

SAFETY DEVICE FOR CONVEYOR BELT

This invention relates to a device to prevent a conveyor belt from snapping at its joint during working, by detecting any abnormal elongation (in lengthwise direction of belt) at the joint at its early stages.

Generally, conveyor belts sometimes snap at the joint during working. This snapping is especially serious in the case of steel cord conveyor belts which are chiefly used for a main line of a factory or for a long line of machines because it involves not only repairing expenses for a snapped belt and scattered substances but also a great loss due to suspension of production on lines concerned. It also relates to accidents resulting in injury or death, for example, in the pit it may give rise to a cave-in accident. It is therefore very important to prevent the steel cord belt from snapping at the joint during working and a proper preventive measure has been earnestly desired.

In the case of a steel cord conveyor belt, it does not snap at a joint suddenly but due to fatigue and other factors the joint elongates partly and such elongation at the joint spreads by degrees and finally the belt snaps at the joint during working. Our experience shows that steel conveyor belts are apt to snap when such partial elongation at the joint reached the extent of 5m.m. – 10m.m. Therefore, snapping of the steel cord belt at the joint can be prevented by detecting any abnormal elongation at the joint at its early stages.

For detecting any partial elongation at the joint, it has been usual practice to put either point marks or line marks by nicking before and behind the joint, with a certain space therebetween, at the right side, the back or the selvage of the belt and to measure the space between marks with a steel tape measure to see if there is any elongation at the joint. This method, however, has such disadvantages that the conveyor belt must be stopped each time the space is measured; it is very difficult to stop the conveyor belt in such a manner that the joint is positioned conveniently for measuring; it takes time to measure the space because measuring is done by hand; reinforcements of a conveyor frame, rollers, etc. are hindrances to carrying out precise measuring; and so on.

This invention intends to eliminate the above-mentioned disadvantages by providing a safety device which can prevent the conveyor belt from snapping at the joint during working, by detecting any abnormal elongation at the joint at its early stages by means of the combination of magnets buried in the conveyor belt and a magnetic inductor, such as coils, whereby electrical signals are generated. This means is based on the characteristic that electricity is generated when a line of magnetic force of magnet crosses a coil.

An object of the present invention is to provide a safety device for a conveyor belt, wherein a pair of magnets buried in portions before and behind the joint or in the joint of belt, with a certain space therebetween, in the lengthwise direction of the belt are detected by a magnetic inductor.

Another object of the present invention is to provide a safety device for a conveyor belt, wherein a pair of magnets mentioned above are detected simultaneously by a pair of magnetic inductors which are arranged with the same space therebetween as said magnets in pairs.

Yet another object of the present invention is to provide a safety device for a conveyor belt, wherein a pair of standard magnets are buried additionally in a portion of the belt other than the joint, with the same space therebetween as a pair of magnets mentioned above, so as to detect any elongation at the joint by comparing a measured value at the joint with a standard value.

A still further object of the present invention is to provide a safety device for a conveyor belt, wherein as a means of self-detecting electrical signals generated at a magnetic inductor an oscillograph is connected to the magnetic inductor for self-recording or a safety device for a conveyor belt, wherein any elongation at the joint of conveyor belt is detected and judged electrically on the time quantity basis by a detecting device including a time measuring circuit and a comparative judging circuit.

Another still further object of the present invention is to provide a safety device for a conveyor belt, wherein measuring precision is improved by eliminating a magnetic field caused by magnetism charged in steel cords during manufactuı ing of conveyor belts, by means of a demagnetizing apparatus disposed close to the conveyor belt.

Another still further object of the present invention is to provide a safety device for a conveyor belt, wherein a part of steel cords is magnetized, instead of burying magnets for detecting and standard magnets as mentioned above, so as to make a steel cord magnetized part which is combined with a magnetic inductor for detecting any elongation at the joint of conveyor belt.

The nature and advantage of the present invention will be understood more clearly from the following description made with reference to several embodiments and accompanying drawings, in which:

FIG. 1 to FIG. 6 inclusive shown Embodiment No. 1, in which

FIG. 17 to FIG. 19 show Embodiment No. 8, in which:

FIG. 21 (a) and (b) show respectively the detecting force before and after the demagnetizing operation.

(Embodiment No. 1)

Figure 1:
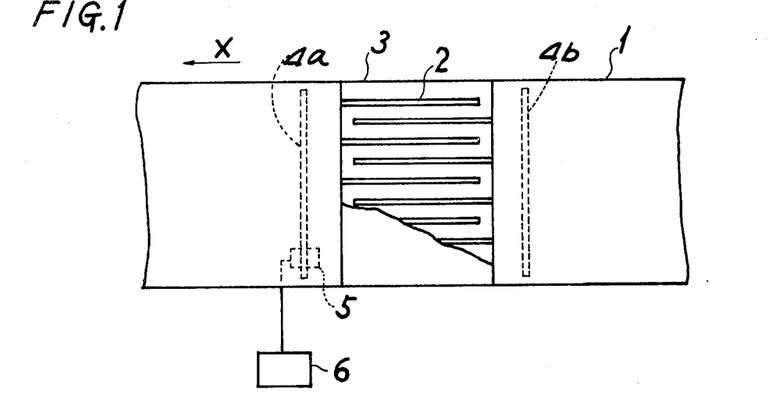
FIG. 1 is a plan view, partly cut away.
Figure 2:
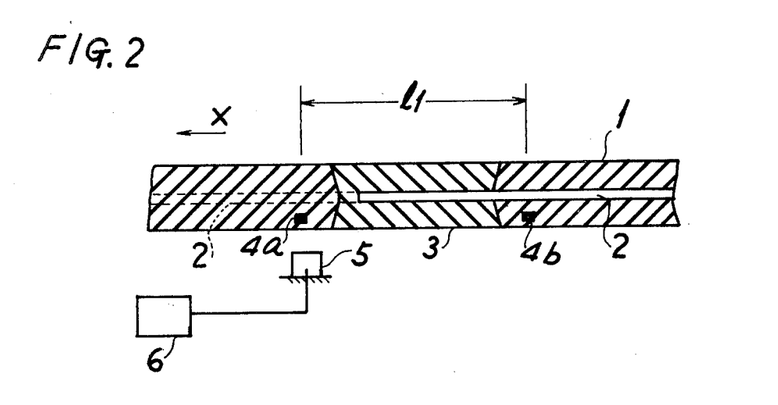
FIG. 2 is a side view in longitudinal section.

In FIG. 1 and FIG. 2, numeral 1 denotes a steel cord conveyor belt in which many steel cords 2, 2 . . . are buried as tension members. Numeral 3 denotes a joint of the conveyor belt as which one end of each steel cord alternates with the other end, as shown in FIG. 1, and rubber is used for joining. A pair of rubber magnets of sash shape 4a, 4b are buried in the belt before and behind the joint 3 in the widthwise direction of the belt and with a certain space $l_1$ therebetween in the lengthwise direction of the belt. Numeral 5 denotes a magnetic inductor (a coil may be used in some cases) to sense the line of magnetic force of the afore-mentioned rubber magnets 4a, 4b. This magnetic inductor 5 is arranged at a conveyor frame side in non-contact with the conveyor belt 1 and is connected to an oscillograph 6 for self-recording.

Figure 3:
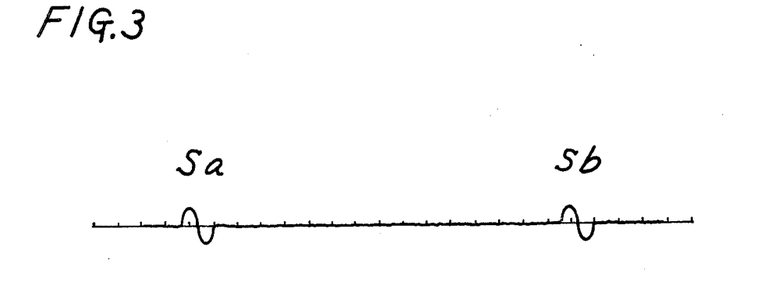
FIG. 3 is a data sheet obtained.

Referring now to the action of the above Embodiment No. 1, when the conveyor belt 1 is travelling in the direction shown by an arrow (X) and the rubber magnet 4a buried in the belt passed above the magnetic inductor 5 (or coil), a signal $S_a$ is generated (refer to FIG. 3). When the conveyor belt advances further and the rubber magnet 4b passes above the magnetic inductor 5 (or coil), a signal $S_b$ is generated (refer to FIG. 3). Since the magnetic inductor 5 (or coil) is connected to the oscillograph 6 so that it may effect self-recording at the fixed paper feeding speed (speed at which a recording is fed), a data sheet as shown by FIG. 3 is obtained. If the space between peak points of the Signal $S_a$ and the signal $S_b$ is measured according to the data sheet, the space between rubber magnets 4a and 4b buried in the conveyor belt 1 can be obtained. Comparison of such a measured space with a standard space given in originally prepared data will enable us to see if there is any elongation at the joint 3.

Figure 4:
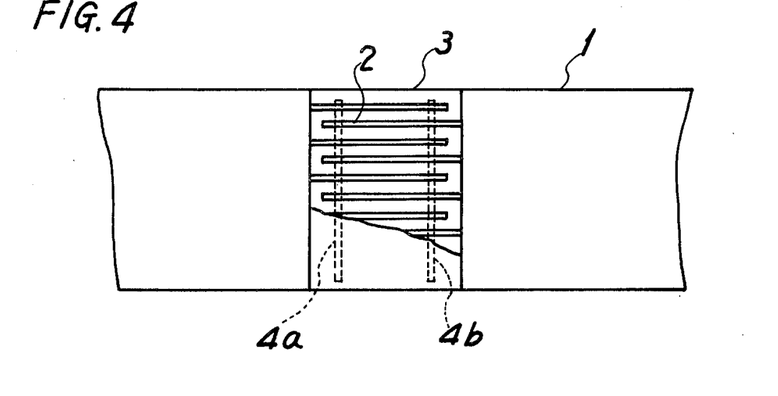
FIG. 4 to FIG. 6 are plan views, partly cut away, of modified embodiments.
Figure 5:
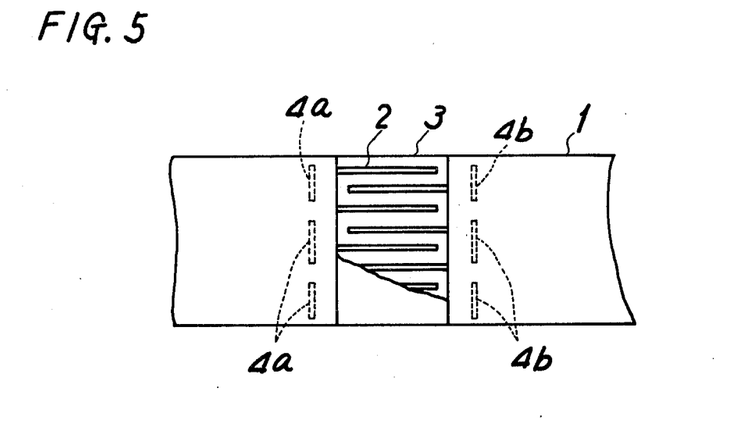

As to the position at which rubber magnets 4a, 4b are buried in the conveyor belt 1, they may be buried at the position as indicated by the above embodiment (refer to FIG. 1 and FIG. 2), i.e. in such a way that the joint 3 is sandwiched in between the two, or, the two may be buried within the joint 3 with a certain space therebetween, as shown in FIG. 4. It is also possible to bury a plurality of rubber magnets by piecemeal in the widthwise direction of the belt, as shown by FIG. 5.

Figure 6:
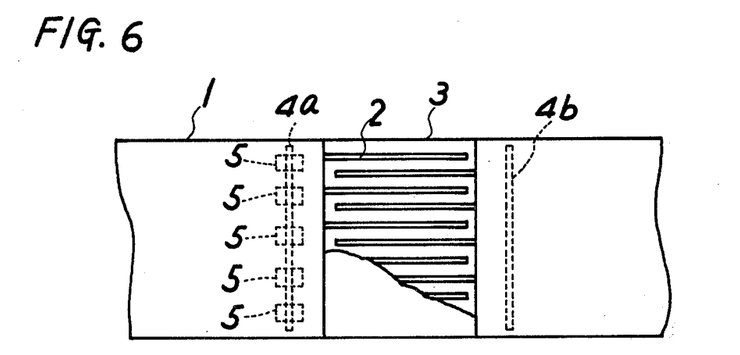

The magnetic inductor 5 (or coil) is disposed in non-contact with the conveyor belt 1 as in Embodiment No. 1 and can be moved in the widthwise direction of the belt, but the number of magnetic inductor is not necessarily limited to one but three to five magnetic inductors may be arranged, depending upon the width of the belt, as shown in FIG. 6.

The oscillograph 6 of one-phenomenon type is used for measuring one by one but that of multi-phenomena type may be used for simultaneous measuring.

The above-mentioned rubber magnets 4a, 4b are composed by mixing powder of barium ferrite, etc. in rubber or synthetic resin (vinyl chloride resin, for example) and by magnetizing such mixture. In order to make these rubber magnets to be buried in the conveyor belt stable signal sources, they are required to have rubber physical property to withstand the use within the conveyor belt, high magnetic flux density (large electromotive force), but low adsorption power and to generate stable signals of high accuracy. The highest magnetic flux density can be obtained by making the ratio of barium ferrite power to rubber 1 – 10, thickness $t$ of rubber magnet 1 – 5m.m. and the residual magnetic flux density 100 – 1,800 gauses.

(Embodimet No. 2)

Figure 7:
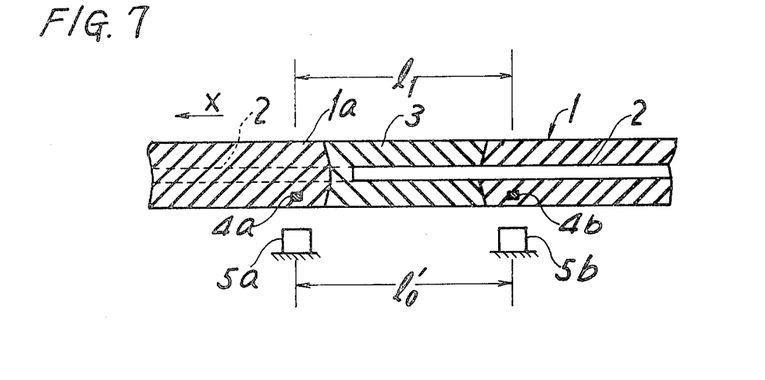
FIG. 7 is a side view, in longitudinal section, of Embodiment No. 2.

As shown by FIG. 7, this embodiment is different from Embodiment No. 1 in that a pair of magnetic inductors 5a, 5b (or a pair of coils) with a space of $l_0$ therebetween, the same as the space $l_1$ between rubber magnets 4a and 4b buried in the lengthwise direction of the belt, is arranged in the lengthwise direction of the belt and in non-contact with the conveyor belt 1. In the other components, Embodiment No. 2 is the same as Embodiment No. 1.

Referring to the action of Embodiment No. 2, when rubber magnets 4a and 4b pass above the magnetic inductors 5a and 5b respectively while the conveyor belt 1 is travelling, electrical signals are generated simultaneously. If elongation is zero or within the allowable limit $\pm \alpha$ m.m., "normal" is indicated, but if elongation is outside the allowable limit $\pm \alpha$ m.m., "abnormal" is indicated and the driving apparatus for the conveyor belt 1 is stopped.

Embodiment No. 3

Figure 8:
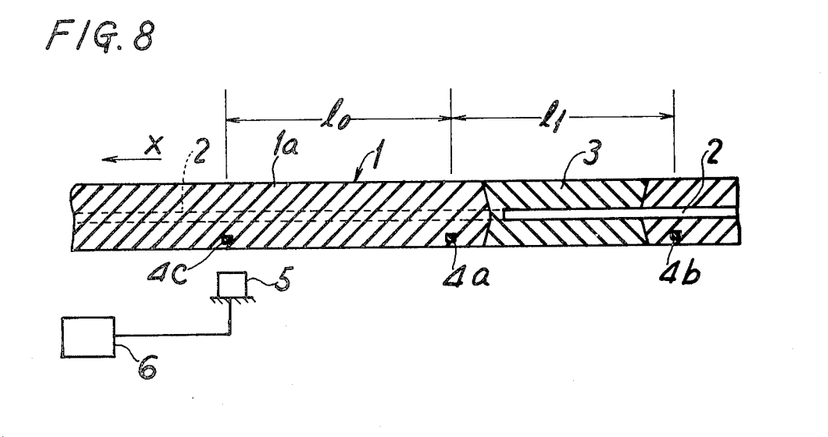
FIG. 8 is a side elevation, in longitudinal section, of Embodiment No. 3.

As shown in FIG. 8, in addition to a pair of rubber magnets, 4a, 4b in Embodiment No. 1, this embodiment has a standard rubber magnet 4c which is buried in a non-joint part 1a of the conveyor belt 1, forwardly the front rubber magnet 4a, with a certain space $l_0$ (standard space) therebetween and in the longitudinal direction of the belt. This standard space $l_0$ is equal to the space $l_1$ (measuring space) between a pair of rubber magnets 4a, 4b (or with a space of certain rate). As the standard rubber magnet 4c and the front measuring rubber magnet 4a are positioned in the non-joint part 1a in which the joint 3 is not included, they are almost free from elongation and as a result the space between the two (4c, 4a) is substantially unchangeable. In the other components, this embodiment is the same as Embodiment No. 1.

Figure 9:
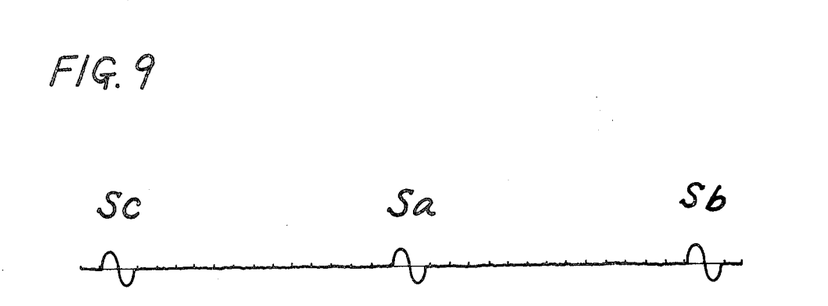
FIG. 9 is a data sheet obtained on the basis of Embodiment No. 3.

Referring to the action of Embodiment No. 3, as shown in FIG. 8, when the conveyor belt 1 is travelling in the direction of an arrow (X) and the standard rubber magnet 4c passes first above the magnetic inductor 5, a signal $S_c$ is generated. When the conveyor belt 1 makes further advance and the front measuring rubber magnet 4a passes above the magnetic inductor 5, a single $S_a$ is generated. Then, when the rear measuring rubber magnet 4b passes above the magnetic inductor 5, a signal $S_b$ is generated. Thus, on the oscillograph 6 connected to the magnetic inductor 5, generated signals $S_c$, $S_a$ and $S_b$ are self-recorded continuously at a certain paper feeding speed (a speed at which a recording paper is fed) and a data sheet as shown by FIG. 9 is obtained. In this data sheet, the space between the peak points of $S_c$ and $S_a$ corresponds to the standard space $l_0$ and the space between peak points of $S_a$ and $S_b$ corresponds to the measuring space $l_1$. Therefore, existence of any elongation at the joint 3 can be detected by comparing the space between the peak points of $S_a$ and $S_b$ (measuring space $l_1$) with the space between the peak points of $S_c$ and $S_a$ (standard space $l_0$), in other words, if any elongation exists at the joint 3, the measuring space $l_1$ should be longer than the standard space $l_o$.

Embodiment No. 4

Figure 10:
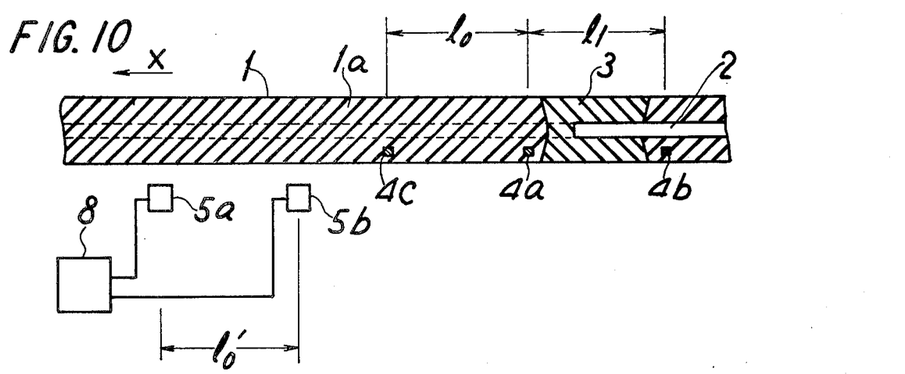
FIG. 10 is a side elevation, in longitudinal section, of Embodiment No. 4.

As shown by FIG. 10, instead of one magnetic inductor 5 (or one coil) in Embodiment No. 3, as shown in FIG. 8, a pair of magnetic inductors 5a, 5b (or a pair of coils) are arranged in the lengthwise direction of the belt with the space $l_o$ therebetween which is equal to the measuring space $l_1$ (or the standard space $l_o$) as in the case of Embodiment No. 2, as shown in FIG. 7, and instead of the oscillograph 6 in Embodiment No. 3 (or Embodiment No. 1), as shown in FIGS. 2 and 8, a pair of magnetic inductors 5a, 5b (or a pair of coils) are connected to an oscillograph 8 of more than two phenomena type respectively and thus, signals generated from each of magnetic inductors 5a and 5b are recorded coaxially in parallel, on the same basis. In the other components, Embodiment No. 4 as shown in FIGS. 10 and 11 is the same as Embodiment No. 3 as shown in FIGS. 8 and 9.

Figure 11:
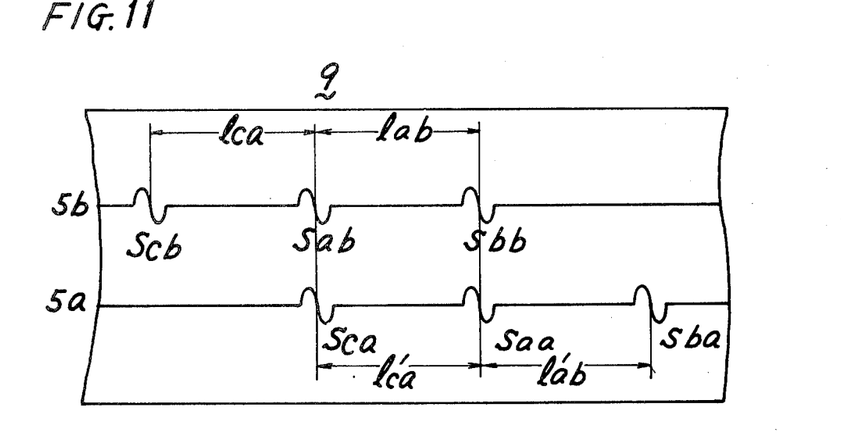
FIG. 11 is a data sheet obtained on the basis of Embodiment No. 4.

Referring to the action of Embodiment No. 4, as shown in FIGS. 10 and 11, when the conveyor belt 1 is travelling in the direction of an arrow (X) and the standard rubber magnet 4c passes above the rear magnetic inductor 5b, a signal $S_{cb}$ is generated and is recorded on the recording paper 9 of the oscillograph 8, as shown by FIG. 11. Then, at the same time as said standard rubber magnet 4c reaches above the front magnetic inductor 5a, the front measuring rubber magnet 4a reaches above the rear magnetic inductor 5b, whereupon a signal $S_{ca}$ and a signal $S_{ab}$ are generated respectively and as shown by FIG. 11, the signal $S_{ca}$ and the signal $S_{ab}$ are recorded simultaneously, coaxially and in parallel on the time basis. Then, at the same time as the front measuring rubber magnet 4a reaches above the front magnetic inductor 5a, the rear measuring rubber magnet 4b reaches above the rear magnetic inductor 5b, whereupon a signal $S_{aa}$ and a signal $S_{bb}$ are recorded in the same way as mentioned above. Lastly, when the rear measuring rubber magnet 4b passes above the front magnetic inductor 5a, a signal $S_{ba}$ is generated and as shown by FIG. 11, the signal $S_{ba}$ is recorded. Data as shown by FIG. 11 are obtained by signals generated at one joint 3.

Judgment of the presence of any elongation at the joint 3 can be made by comparing the measuring space $l_1$ between the measuring rubber magnet 4a and 4b, having the joint 3 therebetween, with the standard space $l_o$ between the front measuring rubber magnet 4a and the standard rubber magnet 4c buried in the belt (part other than the joint 3), in other words, by observing the variance between the signal $S_{bb}$ and the signal $S_{aa}$ on the basis of the variance between the signal $S_{ab}$ and the signal $S_{ca}$. The reason why the variance between the signal $S_{ab}$ and the signal $S_{ca}$ is made the basis is given below.

In general, the conveyor belt 1 has several joints on one line. Intervals at which three rubber magnets, i.e. standard one 4c and measuring ones 4a and 4b, are buried (space $l_o$ and space $l_1$) can be made very precisely by using a jigging apparatus. However, it is very difficult to bury all rubber magnets in all of the joints at quite the same intervals. If operation is carried out at several places where tension distribution of the conveyor belt is different from one another or if the jigging apparatus is dismantled and reassembled, slight errors or slight irregularies will take place among joints. Since coils or the magnetic inductors 5a, 5b arranged at the conveyor frame side are fixed at a certain place in pairs, it is impossible to effect microscopic regulation at each joint. Therefore, it cannot be said definitely that signals $S_{ab}$ and $S_{ca}$ lie on one and the same straight line longitudinally at all joints. With this in view, presence of any elongation at each joint can be judged accurately by observing the variance between the signal $S_{bb}$ and the signal $S_{aa}$ on the basis or errors which exists between the signal $S_{bb}$ and and signal $S_{aa}$ at each joint.

As shown by FIG. 11, it is possible to produce supplementary confirmatory effect by measuring the space $l_{ca}$ between the signal $S_{cb}$ and the signal $S_{ab}$, the space $l_{ab}$ between the signal $S_{ab}$ and the signal $S_{bb}$, the space $l'_{ca}$ between the signal $S_{ca}$ and the signal $S_{aa}$ and the $l'_{ab}$ between the signal $S_{aa}$ and the signal $S_{ba}$.

Embodiment No. 5

Figure 12:
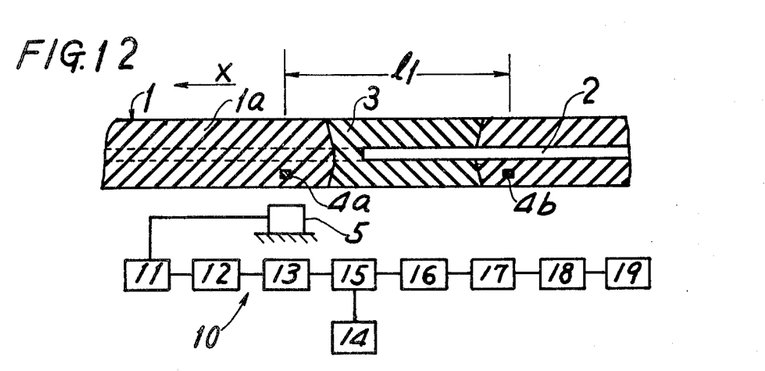
FIG. 12 is a side elevation, in longitudinal section, of Embodiment No. 5.

As shown by FIG. 12, instead of the oscillograph 6 in Embodiment No. 1, as shown in FIGS. 1 and 2 the magnetic inductor 5 is connected with a detecting device 10 comprising a time measuring circuit which measures electrically the signal interval of the magnetic inductor 5 in terms of the time quantity and a judging circuit which judges elongation which is within and outside the time corresponding to elongation as "normal" and "abnormal" respectively. As shown in FIG. 12, this detecting device 10 comprises an amplifier circuit 11, a clipper circuit 12, a monostable multivibrator 13, a shift register 15 having a timer 14, a pulse signal generator 16, a counter 17 and a judging circuit 18. The judging circuit 18 is connected with an alarm circuit 19 which gives an alarm or a stopping circuit (not shown in the drawing) which stops a driving apparatus for the conveyor belt 1. In other components, this embodiment is the same as Embodiment No. 1 as shown in FIGS. 1 and 2.

Referring to the action of Embodiment No. 5, as shown in FIG. 12, when the rubber magnet 4a passes above the magnetic inductor 5 during travelling of the conveyor belt 1 in the direction of an arrow (X), a signal is generated. The signal is detected by the magnetic inductor 5, is amplified by the amplifying circuit 11 and is shaped in wave form by the clipper circuit 12 and the monostable multivibrator 13. Then, pulse is generated from the pulse generator 16 by making the shift register ON. This pulse is converted into time by the counter 17 for measuring. When the rubber magnet 4b passes over the magnetic inductor 5, a signal is generated. Similarly, this signal is detected by the magnetic inductor 5, is amplified by the amplifying circuit 11, is shaped in wave form by the clipper circuit 12 and the monostable multivibrator 13. Then, pulse generation from the pulse generator is stopped by making the shift register 15 OFF. This shift register 15 incorporates therein the timer 14 by which registration is cleared after the measuring for a certain period of time. This clearing terminates measuring of time and the buried space between the rubber magnets 4a and 4b is measured in terms of the time quantity. For instance, suppose the belt speed of the conveyor belt 1 is 100 meters/minute, in the case where the buried space $l_1$ between the rubber magnets 4a and 4b is 1000m.m., it takes for the belt 600m sec. to pass through this space. If the measured time is $(600 + 0.6\alpha)$m sec., the buried space $l_1$ of the rubber magnets is $(1000 + \alpha)$mm, indicating that there exists elongation of $\alpha$ mm at the joint.

Therefore, the time (0.6α m sec.) corresponding to this elongation α mm is judged by the judging circuit 18 to see whether it is "normal" or "abnormal" and if judged as "abnormal", an alarm is given by the alarm circuit 19 or the driving apparatus for the conveyor belt 1 is stopped by the stopping circuit.

Embodiment No. 6

Figure 13:
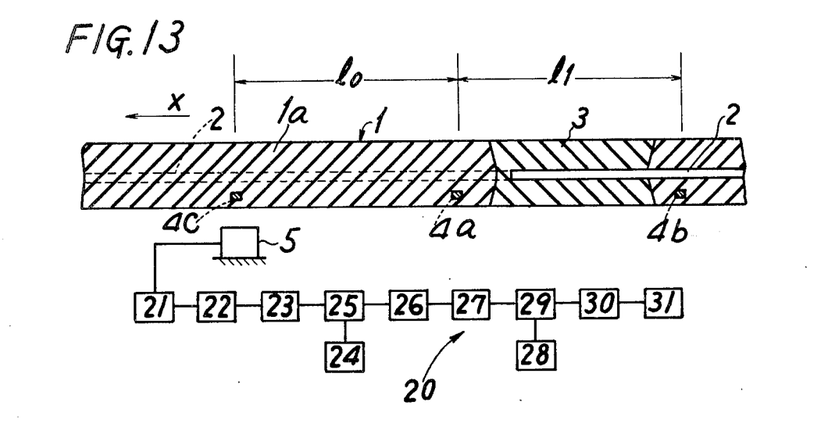
FIG. 13 is a side elevation, in longitudinal Section, of Embodiment No. 6.

As shown by FIG. 13, instead of the oscillograph 6 in Embodiment No. 3, as shown in FIG. 8, the magnetic inductor 5 is connected with a detecting device 20 which measures and judges electrically, on the time quantity basis, the signal interval corresponding to the standard space $l_o$ and the signal interval corresponding to the detecting space $l_1$ which the magnetic inductor 5 detects respectively. As shown in FIG. 13, this detecting device 20 comprises an amplifying circuit 21, a clipper circuit 22, a monostable multivibrator 23, a shift register 25 having a timer 24, a pulse signal generator 26, a counter 27, an arithmetic circuit 29 with a memory 28 and a judging circuit 30, in the order given. The judging circuit 30 is connected with an alarm circuit 31 which gives an alarm or a stopping circuit (not shown in the drawing) which stops a driving apparatus for the conveyor belt 1. More particularly, the detecting device 20 measures electrically on the time quantity basis both the standard space $l_o$ and the measuring space $l_1$. If, in this case, the measured space $l_1$ is shown within the time corresponding to α mm elongation (abnormal elongation), it is judged as "normal" but if shown outside, it is judged as "abnormal". In the other components, this embodiment is the same as Embodiment No. 3 as shown in FIG. 8.

Figure 14:
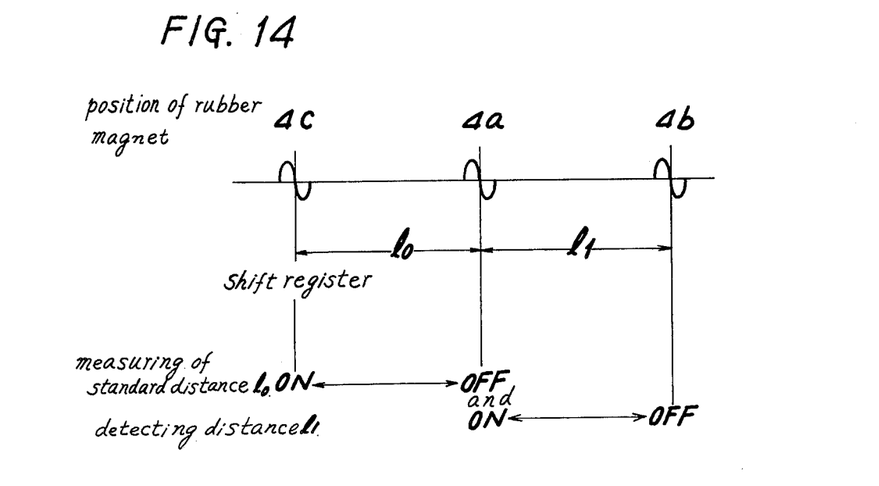
FIG. 14 is a diagram of the operation according to Embodiment No. 6.

Referring to the action of Embodiment No. 6, as shown in FIG. 13, when the standard rubber magnet 4c passes above the magnetic inductor 5 while the conveyor belt 1 is travelling in the direction of an arrow (X), a signal is generated. This signal is received by the magnetic inductor 5, is amplified by the amplifying circuit 21, and is shaped in wave form by the clipper circuit 22 and the monostable multivibrator 23. Pulse is generated from the pulse signal generator 26 by making the shift register 25 ON. This pulse is converted into time by the counter 27 for measuring. Then, when the front measuring rubber magnet 4a passed over the magnetic inductor 5, the shift register 25 is made OFF by the clearing action of the timer 24 after the lapse of a certain period of time and the pulse generation is stopped. Pulses generated during this time (time corresponding to the standard space $l_o$) are converted into time for measuring. If this time is converted into a space length by the arithmetic circuit 29, we obtain the standard space $l_o$, which is stored by the memory 28. (Refer to FIG. 14).

When the front measuring rubber magnet 4a passes above the magnetic inductor 5, the shift register 25 is made ON, whereupon pulse is generated from the pulse generator 26. Then, when the rear measuring rubber magnet 4b passes above the magnetic inductor 5, the shift register 25 is made OFF, whereupon generation of pulse is stopped. Pulses generated during such period of time (time corresponding to the measuring space $l_1$) are converted into time by the counter 27 and the time thus obtained is further converted into the space length (the measured space $l_1$) by the arithmetic circuit 29. (Refer to FIG. 14). This measured space $l_1$ is judged by the judging circuit 30, in comparison with the standard space $l_o$. If there exists elongation of α mm at the joint 3, the measured space $l_1$ will be longer than the standard space $l_o$, i.e. $l_1 = l_o + \alpha$ ($> l_o$). If the elongation of α mm is abnormal elongation, an alarm is given by the alarm circuit 31 or the driving apparatus for the conveyor belt 1 will be stopped. Thus, the belt is prevented from snapping at the joint 3.

Embodiment No. 7

Figure 15:
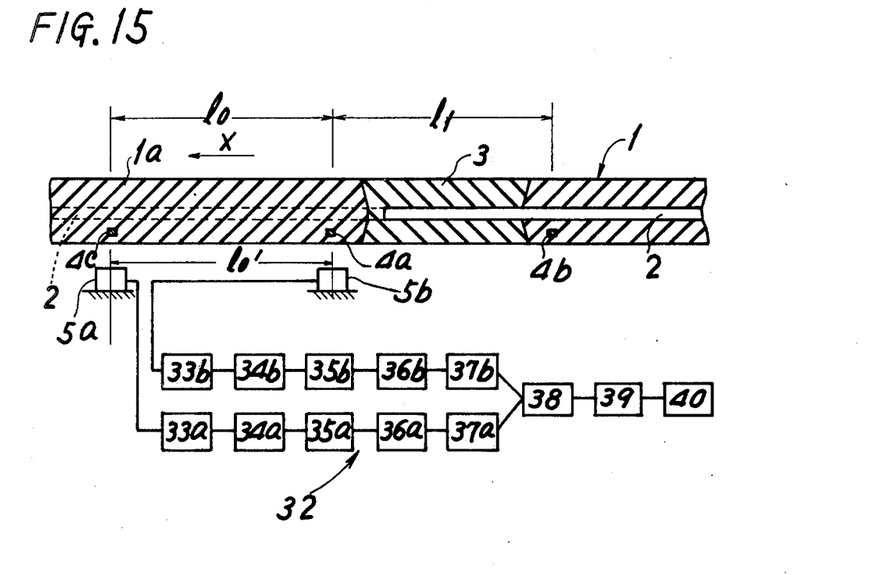
FIG. 15 is a side elevation, in longitudinal section, of Embodiment No. 7.

As shown by FIG. 15, instead of one magnetic inductor 5 in Embodiment No. 3, as shown in FIG. 8 a pair of magnetic inductors 5a, 5b are arranged as in the case of Embodiment No. 2 as shown in FIG. 7, and instead of the oscillograph 6 in Embodiment No. 3, as shown in FIG. 8 each of the magnetic inductors 5a and 5b is connected to a detecting device 32 which measures electrically, on the time quantity basis, signal intervals corresponding to the standard space $l_o$ and the measured space $l_1$ which the magnetic inductors 5a and 5b detect and a detecting device 32 further makes comparative judgment. As shown in FIG. 15, this detecting device 32 comprises amplifying circuits 33a, 33b which are connected to the magnetic inductors 5a and 5b respectively, wave shaping circuits 34a, 34b, shift registers 35a, 35b, pulse signal generators 36a, 36b, counters 37a, 37b, an arithmetic circuit 38 to which the counters 37a and 37b are connected and a judging circuit 39. The judging circuit 39 is connected to an alarm circuit 40 which gives an alarm where necessary or to a belt stopping circuit (not shown in the drawing) for stopping the driving of the conveyor belt 1.

Referring to the action of Embodiment No. 7, as shown in FIG. 15, when the standard rubber magnet 4c and the front measuring rubber magnet 4a pass above the front magnetic inductor 5a and the rear magnetic inductor 5b respectively (whenever the standard rubber magnet 4c is above the magnetic inductor 5a, the front measuring rubber magnet 4a is positioned above the magnetic inductor 5b. This relationship is invariable). Signals from 4c and 4a are received simultaneously by the magnetic inductors 5a and 5b respectively.

The signal received by the front magnetic inductor 5a is amplified by the amplifying circuit 33a and is shaped in wave form by the wave form shaping circuit 34a. Then, shift register 35a is made ON, whereupon pulse is generated from the pulse generator 36a and is converted into time by the counter 37a for the purpose of measuring. When the front measuring rubber magnet 4a passes above the magnetic inductor 5a, the shift register 35a is made OFF, whereupon generation of pulse is stopped. Pulses generated during such period of time (the time corresponding to the standard space $l_o$) are converted into time, which is measured. Thus, standard time $t_o$ is obtained.

On the other hand, the signal received by the magnetic inductor 5b is amplified by the amplifying circuit 33b and is shaped in wave form by the wave form shaping circuit 34b. Then, the shift register 35b is made ON, whereupon pulse is generated from the pulse generator 36b. When the rear measuring rubber magnet 4b passes above the magnetic inductor 5b, the shift register 35b is made OFF, whereupon generation of pulse is stopped. Pulses generated during such period of time (the time corresponding to the measured space $l_1$) are converted into time by the counter 37b and thus the measured time $t_1$ is obtained.

Figure 16:
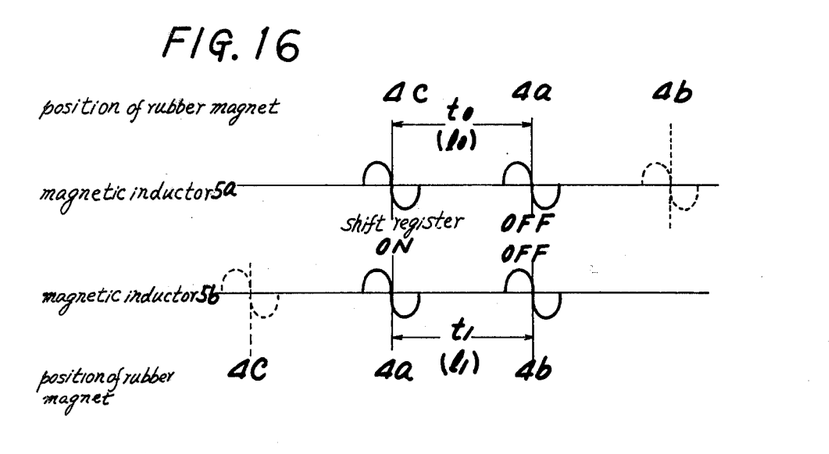
FIG. 16 is a diagram of the operation according to Embodiment No. 7.

The standard time $t_o$ corresponding to the standard space $l_o$ and the measured time $t_1$ corresponding to the measured space $l_1$ which are measured simultaneously are shown in wave form in FIG. 16.

The measured time $t_1$ is judged in comparison with the standard time $t_o$ by the judging circuit 39 through the medium of the arithmetic circuit 38, in the following way.

$l_1/l_o = t_1/t_o$

Where, for example, $l_o$=1,000 (mm)
$t_o$ =0.6000 (sec)
$t_1$=0.6000 + $\beta$ (sec)
$l_1$ = 1,000 + $\alpha$ (mm)(>$l_o$)

Thus, the measured space $l_1$ is longer than the standard space $l_o$ by $\alpha$ mm. If this elongation of $\alpha$ mm is abnormal elongation, an alarm is given by the alarm circuit 40 or the driving of the conveyor belt 1 is stopped by the stopping circuit (not shown in the drawing) so as to prevent the belt from snapping at the joint 3.

When the standard rubber magnet 4c passes above the rear magnetic inductor 5b or the rear measuring rubber magnet 4b passes above the magnetic inductor 5a, a signal is generated is received by the magnetic inductor 5a or 5b but is not put in the circuits of the detecting device 32.

Embodiment No. 8

Figure 17:
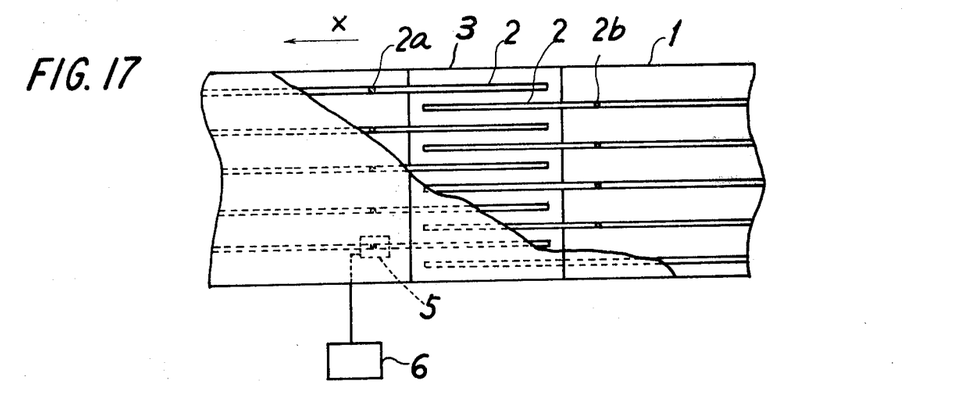
FIG. 17 is a plan view, partly cut away.
Figure 18:
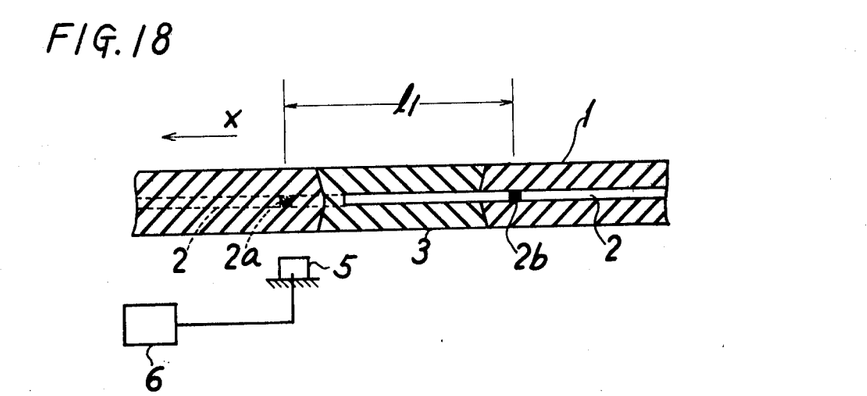
FIG. 18 is a side elevation, in longitudinal section.
Figure 19:
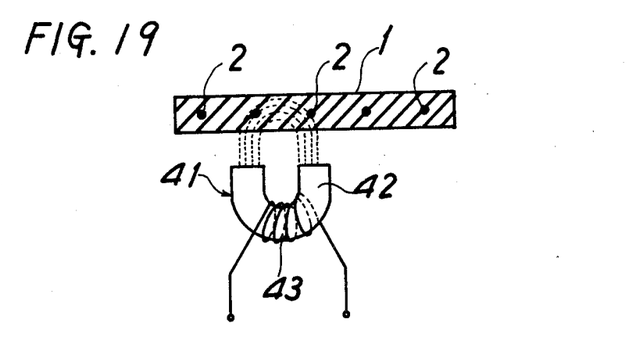
FIG. 19 is a front view, showing the method of magnetizing steel cord.

In the foregoing embodiments ranging from No. 1 to No. 7, as shown in FIG. 1, 2, 4 through 8, 10, 12, 13 and 15, rubber magnets 4a, 4b and 4c are used as signal sources buried in the conveyor belt 1, but chrome steel, cobalt steel, barium ferrite, etc. may be used as magnets for this device. However, the rubber magnet is most suitable because when it is buried in the conveyor belt, it does not damage the belt itself for its pliability (elasticity inherent in rubber). In this embodiment, as shown in FIGS. 17-19, instead of rubber magnets, steel cord magnetized portions 2a, 2b (a part of steel cords 2 which are tension members of the conveyor belt 1 is magnetized) are provided. In the other components, this embodiment is the same as Embodiment No. 1, as shown in FIGS. 1 and 2. Although not shown in the drawing, steel cord magnetized portions 2a, 2 b can safely be applied to Embodiments No. 2 – 7, as shown in FIG. 1, 2, 4, 5, 6, 7, 8, 10, 12, 13, 15 and 17 - 19, excepting Embodiment No. 1.

The method of forming steel cord magnetized portions 2a, 2b in the steel cord conveyor belt 1 is described below, with reference to FIG. 19.

Since steel cord 2 is made of high class carbon steel, it is a high magnetic substance in itself and accordingly can be magnetized easily. As to the magnetizing apparatus 41 for magnetizing the steel cord 2, it is a magnetic material 42 of horseshoe shape composed of steel, nickel, silicon steel, etc., around which coil 43 is wound and to which electric current is applied to make it an electro-magnet. This magnetizing apparatus 41 can be made applicable to various magnetizing dimensions by varying the shape of magnetizing surface of magnetic material 42. In forming steel cord magnetized portions 2a, 2b, the magnetizing apparatus 41 is disposed very close to the conveyor belt 1, with a slight gap (0 – 200mm) therebetween. Then, electric current is applied to the magnetizing apparatus 41 to make the magnetic field which extends over a part of steel cord 2 intended for magnetization (steel cord portions between which the joint 3 is sandwiched in). This magnetic field is impressed and almost at the same time electric current is shut off, whereupon a part of the steel cord 2 is magnetized and holds residual magnetism. Thus, steel cord magnetized portions 2a, 2b are formed. If the electric current to be applied to the magnetizing apparatus 41 is made variable, magnetization of any desired extent can be realized. Magnetism of the steel cord magnetized portions 2a, 2b is less demagnetized by impact and other factors because the steel cord is covered with rubber which is material for the belt. If a pair of magnetizing apparatuses 41, 41 are arranged permanently, with a certain space therebetween in the lengthwise direction of the belt, magnetization of the steel cord 2 can be done easily at any time.

Embodiment No. 9

In the conveyor belt 1 in each of the above-mentioned Embodiments No. 1 - No. 8, as shown in FIGS. 1, 2, 4, 5, 6, 7, 8, 10, 12. 13, 15 and 17 - 19, steel cords 2, 2 . . . . are buried as tension members of the conveyor belt 1. This kind of steel cord is generally composed by intertwisting material wire of 0.2 – 0.4mm in dia. at 7 × 7 or 7 × 19. Such material wire is made by drawing a piano wire rod of 3 – 5mm in dia. into a wire of 0.2 – 0.4mm in dia. under a dry system or a wet system, using dies. In this case, wire is sometimes magnetized to some extent by its passing through dies several time in the same direction. Therefore, if such steel cord 2 which is magnetized to some extent is buried in the conveyor belt 1, its magnetic field (though much smaller than the magnetic field by rubber magnets 4a, 4b and 4c in Embodiments No. 1 – No. 8, as shown in FIGS. 1, 2, 4, 5, 6, 7, 8, 10, 12, 13, 15 and 17 - 19, or by the steel cord magnetized portions 2a, 2b), it may involve some irregularity to the output of the magnetic inductor 5 (or 5a, 5b) and as a result, may cause erroneous action in the detecting of elongation at the joint.

Figure 20:
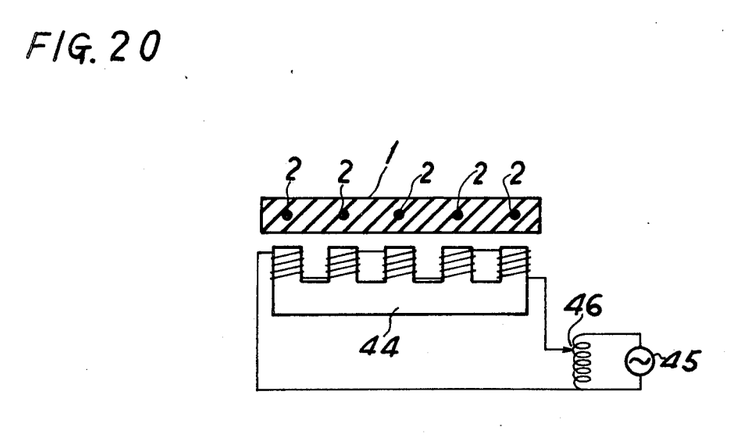
FIG. 20 is a side elevation, in longitudinal section, of Embodiment No. 9.

With the above in view, in this embodiment as shown in FIG. 20 a demagnetizing apparatus by which the AC magnetic field impressed on the steel cord 2 is gradually decreased, is disposed close to the conveyor belt 1 so as to eliminate the magnetic field in the steel cord 2. As this demagnetizing apparatus, an electro-magnet 44 is disposed close to the conveyor belt in the entire widthwise direction of the belt and is excited by an electricity source 45.

Figure 21:
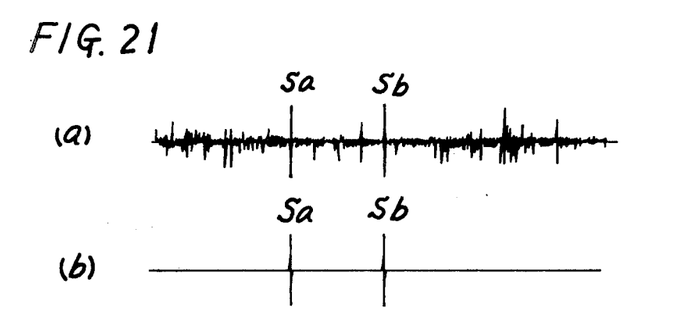

This electricity source 45 is a variable voltage AC source provided with a slidac (variable resistor) 46. Therefore, AC magnetic field by the electro-magnet 44 is adjustable for dwindling of its magnitude. This AC magnetic field should be such that its maximum value does not exceed coercive force of rubber magnets 4a, 4b, 4cor steel cord magnetized portions 2a, 2b, etc. If the conveyor belt 1 is turned round two or three times initially and then turned further several times while dwindling the AC magnetic field by the electro magnet 44, magnetism which charged the steel cord 2 buried in the conveyor belt 1 while the steel cord is being manufactured, is entirely eliminated. In this case, rubber magnets 4a, 4b, 4c or the steel cord magnetized portions 2a, 2b are unaffected by this demagnetizing operation and maintain their own initial magnetism. FIG. 21(a) and FIG. 21 (b) are data sheet of the output of the magnetic inductor 5 in Embodiment No. 1, as shown in FIGS. 1, 2, 4 throught 6, before and after the demagnetizing operation. FIG. 21 (a) shows a part of measurement before the demagnetizing operation. From this figure, it can be seen that if the force of magnetic field by the rubber magnets 4a, 4b is regarded as 1, the force of magnetic field by the steel cord 2 is in the range of 0.4 – 0.5. However, after the above-mentioned demagnetizing operation by turning round the conveyor belt 1 three or four times was carried out, output signals $S_a$, $S_b$ were obtained only at the portions where the rubber magnets 4a, 4b are buried, as shown by FIG. 21 (b).

From the foregoing, it can be said that the safety device for conveyor belts according to the present invention has solved the problem of snapping of conveyor belts and produces excellent effect as mentioned below.

a. Since it can detect easily and automatically the abnormal elongation at the joint of steel conveyor belt in its early stages, it can prevent the steel conveyor belt from snapping at the joint without fail.

b. By providing a pair of magnetic inductors or coils with the same space left therebetween as the space between a pair of rubber magnets or steel cord magnetized portions, presence of elongation at the joint can be detected by simultaneous sending by both magentic inductors (or both coils). Accordingly, any abnormal elongation can be detected in a moment and automatic prevention of snapping at the joint is possible.

c. By providing standard rubber magnets or steel cord magnetized portions in the belt, effect of distance errors at detecting steel cord magnetizing portions of each joint of the belt can be reduced and accordingly more precise judgment can be made. Moreover, as judgment is based on comparison between the measured space and the standard space, such judgment is not affected by the changes of the belt running speed and the recording paper feeding speed.

d. Since a pair of magnetic inductors or coils are connected to an oscillograph of more than two phenomena type and generated signals are recorded coaxially in parallel, it is possible to judge presence of any elongation at the joint at a glance.

e. By connecting the magnetic inductor or the coil to a detecting device including a time measured circuit and a comparative judging circuits, it is possible to judge any abnormal elongation at the joint of steel conveyor belt electrically on the time quantity basis. Therefore, judgment can be done easily and snapping at the joint can be prevented fully automatically.

f. By arranging a pair of magnetic inductors at the same intervals as the intervals at which standard and measured rubber magnets are buried in the belt, the standard space and the measuring space can be measured simultaneously by each magnetic inductor, for comparative judgment. Therefore, measuring of both can be done under the same condition, irrespective of the change in belt running speed, movement of the belt in a zigzag direction, etc. Thus, no error is involved even by repeated measuring and accordingly, precise measuring and accurate judgment can be realized. Besides, since the comparative judgment of the standard space and the measured space is done on the basis of simultaneous measuring by a pair of magnetic inductors, no measuring error takes place because both are affected simultaneously by the outside noise.

g. By providing the detecting device with an alarm circuit or a belt stopping circuit, it is possible to give an alarm or to stop driving of the conveyor belt whenever abnormal elongation takes place at the joint. Thus, snapping at the joint can be prevented without fail.

h. Since the oscillograph or the detecting device is simple in construction, there is no fear of erroneous action and the measuring can be done easily and at cheap cost.

i. Since observation of elongation at the joint can be fully automated, there is no such error as caused by visual observation. Accordingly, measured can be done precisely and labor required for watching or running conveyor belt can be saved.

j. By using steel cord magnetized portions as a signal source, problems raised in burying magnets in the belt or in cutting out the belt can be solved. As the magnetizing apparatuses are disposed in such a fashion that a space therebetween is changeable, distance error of steel cord magnetized portions is almost zero, irrespective of the number of joints of each belt. Moreover, as such apparatuses need not be buried in the conveyor belt, they can be manufactured in a short time and at cheap cost. Besides, by installing the magnetizing apparatus over the belt line, it is possible to obtain a signal source (steel cord magnetized portions) even while the belt is running.

k. By arranging a demagnetizing apparatus close to the conveyor belt, the magnetic field by the steel cord of tension members of the conveyor belt can be eliminated and therefore signals originating from magnets or from steel cords magnetized portions can be selected definitely, with the result of improvement in measuring accuracy.

What is claimed is:

1. A safety device to detect elongation in a conveyor belt joint, said conveyor belt adapted to move at a substantially constant speed, said safety device comprising at least one first permanently magnetized area within said conveyor belt, at least one second permanently magnetized area within said conveyor belt and initially spaced a standard distance apart from said first at least one permanently magnetized area along the length of said conveyor belt, said first permanently magnetized area in the proximity of the forwardmost portion of said conveyor belt joint, said second permanently magnetized area in the proximity of the aftermost portion of said conveyor belt joint, at least one inductor adapted to respond to at least one said first permanently magnetized area and to at least one said second permanently magnetized area as said conveyor belt is moving past its, and means to measure the time lapse between said first permanently magnetized area response and said second permanently magnetized area response whereby the distance between said first and second permanently magnetized areas may be measured.

2. The invention as claimed in claim 1 including at least one additional inductor adapted to respond to at least one said first and second permanently magnetized areas, said additional inductor spaced said same standard distance from said other inductor as said first and second permanently magnetized areas are intially spaced from each other.

3. The invention as claimed in claim 1 including at least one additional permanently magnetized area in said conveyor belt forward of said first permanently magnetized area and initially spaced said standard distance forward of said first permanently magnetized area.

4. The invention as claimed in claim 1 wherein said means to measure said time lapse includes an oscillograph.

5. The invention as claimed in claim 1 wherein said means to measure said time lapse includes a time measuring circuit and a comparative judging circuit.

6. The invention as claimed in claim 1 wherein said permanently magnetized areas are rubber magnets.

7. The invention as claimed in claim 1 wherein said permanently magnetized areas are permanently magnetized areas in steel cord longitudinally placed in said conveyor belt.

* * * * *